United States Patent [19]

Dybel

[11] 4,048,848
[45] Sept. 20, 1977

[54] LOAD MONITORING SYSTEM

[76] Inventor: Frank R. Dybel, 981 Wingate Road, Olympia Fields, Ill. 60461

[21] Appl. No.: 682,463

[22] Filed: May 3, 1976

Related U.S. Application Data

[63] Continuation of Ser. No. 521,466, Nov. 6, 1974, abandoned.

[51] Int. Cl.² ............................................. G01B 7/16
[52] U.S. Cl. .............................. 73/88.5 R; 73/141 A; 73/DIG. 4
[58] Field of Search ......... 73/88.5 R, DIG. 4, 141 A; 100/99

[56] References Cited

U.S. PATENT DOCUMENTS

| | | | |
|---|---|---|---|
| 2,775,118 | 12/1956 | Legge et al. | 73/88.5 R |
| 2,924,968 | 2/1960 | Colten et al. | 73/88.5 R |
| 3,108,470 | 10/1963 | Martin | 73/88.5 R |
| 3,169,394 | 2/1965 | Vosteen et al. | 73/88.5 R |
| 3,197,697 | 7/1965 | McCauley | 73/88.5 R X |
| 3,212,324 | 10/1965 | Martin | 73/88.5 R |
| 3,389,432 | 6/1968 | Griesheimer et al. | 73/88.5 R X |
| 3,612,966 | 10/1971 | Dybel | 73/88.5 R X |
| 3,680,365 | 8/1972 | Summers | 73/88.5 R |
| 3,858,440 | 1/1975 | Budraitis | 73/88.5 R |

Primary Examiner—Charles A. Ruehl
Attorney, Agent, or Firm—Leydig, Voit, Osann, Mayer & Holt, Ltd.

[57] ABSTRACT

A load monitoring system for force carrying members, such as pitmans of production presses, which is adapted to indicate directly in tons the loading incurred by the member during its successive operating strokes. The system further includes load limiting means having a control dial with a numerical readout which when set to a selected number causes an overload detection means to be activated when the load on the member exceeds the number of tons set on said dial. Means are provided for permitting the indicator to register the maximum load the member sustains during an overload stroke and to hold that reading indefinitely.

28 Claims, 3 Drawing Figures

LOAD MONITORING SYSTEM

DESCRIPTION OF THE INVENTION

This is a continuation application based upon copending application Ser. No. 521,466, filed Nov. 6, 1974 and entitled "Load Monitoring System", now abandoned.

The present invention relates generally to load sensing devices, and more particularly to systems for monitoring and controlling the loads on force carrying members, such as the pitmans of production presses.

Systems presently are known for indicating the loads on presses in terms of a percentage of their rating capacity. Systems, such as shown in my U.S. Pat. No. 3,612,966 issued Oct. 12, 1971, also are adapted for automatically shutting off the press if the load incurred by the force carrying member exceeds a predetermined percentage of the capacity.

The ratings for press dies and all load calculations concerning their use, however, generally are in terms of tons. Furthermore, press operators often do not know the rated capacity of the press, nor the manner in which that capacity is distributed among the various force carrying pitmans of the press, nor the procedure for converting a percent capacity to actual tonnage. Such calculations also may vary for different presses, and the forces incurred can change dramatically during the press operation. Thus, present load indicating systems do not enable the press operator to readily know the actual tonnage loads incurred by the various force carrying members of a press during its varied operating conditions. In addition, while control systems are available for shutting down the press in the event of an overload, if the operator is not present at the time of the overload he will not know the maximum load that was incurred on the press member during the overload stroke.

It is an object of the present invention to provide a load monitoring system for force carrying members, such as press pitmans, that is adapted to directly indicate in tons the maximum loads incurred by the member during its successive operating strokes.

Another object is to provide a load monitoring system as characterized above that may be easily set to limit the loads in the force carrying member to a specific tonnage.

A further object is to provide a load monitoring system of the above kind which will activate a detection means in the event of an overload and also indicate the maximum loading incurred on the force carrying member during the overload stroke.

A related object is to provide such a load monitoring system which will indicate the maximum tonnage sustained during an overload stroke and hold that indication indefinitely so that it can be known to an operator even if not in the vicinity of the press at the time of the overload.

Yet another object is to provide a load monitoring system of the foregoing type that is adpated to hold a tonnage reading after each working storke for a sufficient time to enable an operator to easily observe the highest loads being sustained during relatively fast operation of the press.

Finally, still a further object is to provide a load monitoring system of the type set forth that is of relatively simple and economical construction and which is readily adaptable for use on presses of different sizes.

Other objects and advantages of the invention will become apparent upon reading the following detailed description and upon reference to the drawings in which:

While the invention is susceptible of various modifications and alternative constructions, a certain illustrative embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

Figure 1:
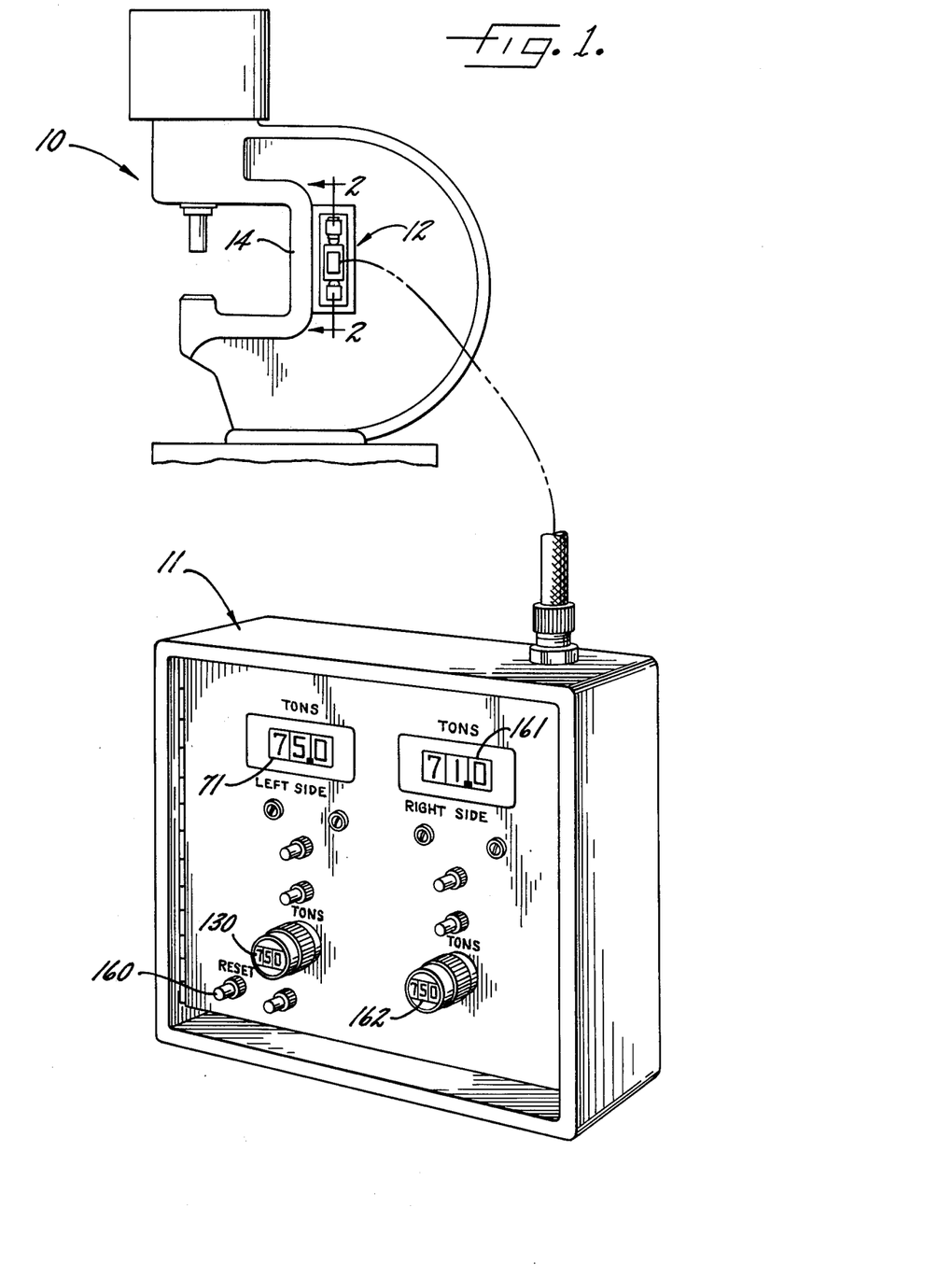
FIG. 1 is a perspective of a load monitoring system of the present invention mounted on a typical punch press.
Figure 2:
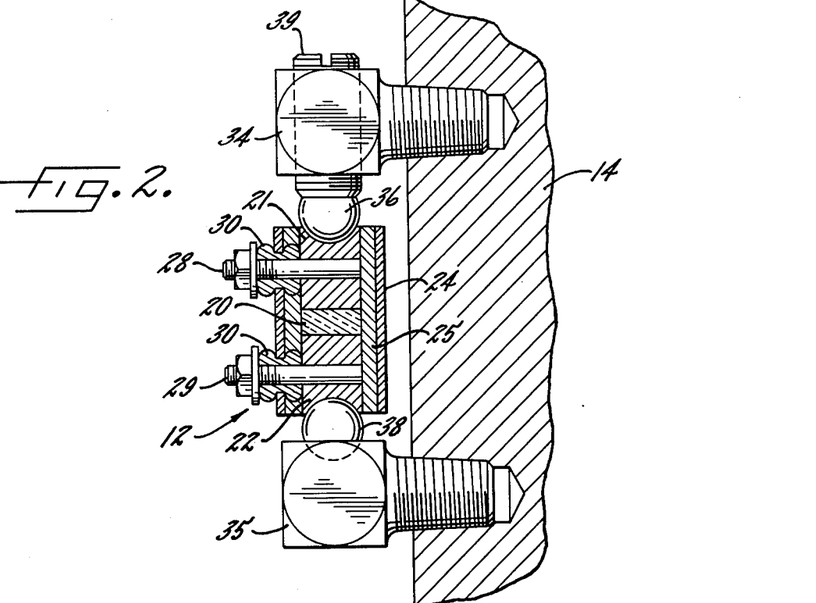
FIG. 2 is a fragmentary section of the stress sensing transducer for the illustrated load monitoring system taken in the plane of line 2—2 in FIG. 1.

Referring now more particularly to FIG. 1 of the drawings, there is shown a typical punch press 10 having a load monitoring system embodying the present invention. The load monitoring system includes a monitor 11 connected to a piezoelectric stress sensing transducer 12 mounted upon a pitman 14 of the press 10. The transducer 12, which may be of a type described in more detail in applicant's U.S. Pat. No. 3,612,966, includes a piezoelectric ceramic crystal 20 positioned between a top terminal block 21 and a bottom terminal block 22 with the top and bottom faces of the crystal 20 being in contact with and against the surface of each of the respective terminal blocks. As shown in FIG. 2, the terminal blocks 21, 22 and crystal 20 are surrounded by a metallic sheath 24 which serves as a magnetic and electric shield. The sheath 24 is slightly larger than the terminal blocks and crystal to provide space for a surrounding layer 25 of an encapsulating and insulating plastic material. Leading from the terminal blocks through the insulating layer 25 and the metallic sheath 24 are terminals 28, 29 with suitable connections for attachment of leads. The terminals 28, 29 and hence the terminal blocks are electrically insulated from the sheath 24 at the passageway therethrough by the terminal insulators 30. The sheath 24 is grounded to the shield of the shielded cables by suitable connections, not shown.

The transducers 12 is mounted on the pitman 14 so that a line normal to the crystal faces at the interfaces between the crystal 20 and the terminal blocks 21, 22 is parallel to and aligned with the stress to be measured in the pitman 14 when under load during a working cycle. The transducer 12 is supported between two points in spaced relation to the pitman 14 to provide what may be characterized as a parallel mechanical circuit for shunting a small portion of the stress in the member 14 to the transducer 12. The transducer in this case is clamped between the ends of two brackets 34, 35 that are screwed into the force carrying pitman 14. The ends of the brackets 34, 35 between which the transducer is clamped are provided with ball and socket joints including balls 36 and 38 that engage sockets in the terminal blocks 21 and 22, respectively. The brackets preferably are electrically insulated from the terminal blocks by the balls 36 and 38 which may be made of a refractory insulating material.

In order to permit desired prestressing of the transducer crystal 20, a set screw 39 is provided in the end of the top bracket 34. After the transducer 12 is in position, the set screw 39 is screwed to secure it under a clamping pressure that places the crystal 20 in a prestressed condition. The amount to which the crystal is prestressed must be sufficient so that it is in a stressed condition under all conditions of loading on the member. In such condition, during the working cycle of the press, the resulting changes in stress in the pitman 14 will act upon the transducer through its support bracketry 34, 35 and cause the piezoelectric crystal 20 to produce relatively high voltage output signals proportional to the stress changes.

Figure 3:
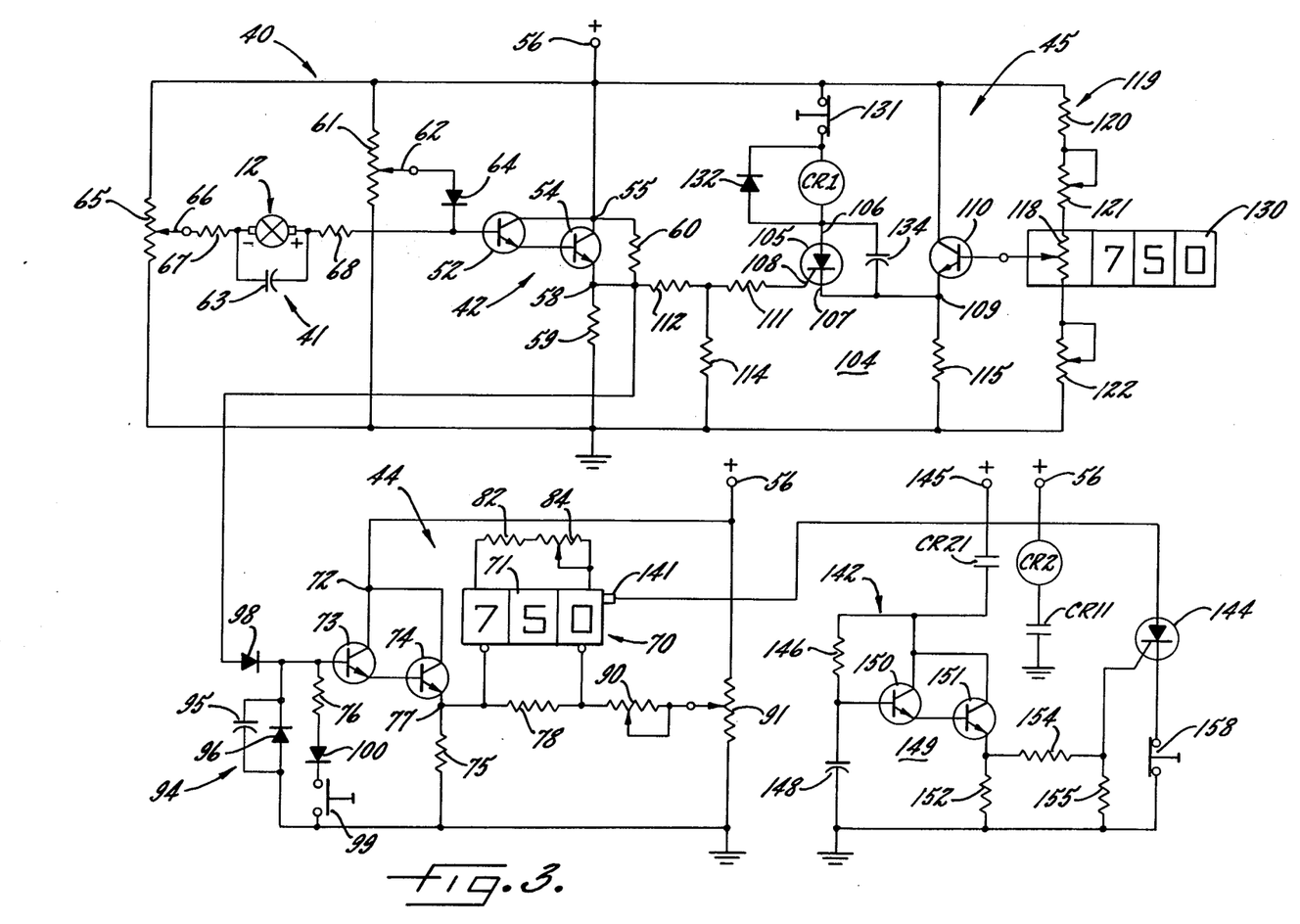
FIG. 3 is a diagram of the sensing circuity for the monitoring system shown in FIG. 1.

Referring to FIG. 3, there is diagrammatically shown a sensing circuit 40 for the monitor 11 which is adapted to utilize output signals from the transducer 12 to indicate and control the loads on the press pitman. The sensing circuit 40 includes an input circuit 41 for a current amplifier 42, a load indicating circuit 44, and a load limiting circuit 45. The output terminals 28, 29 of the transducer 12 are coupled to the input circuit 41 for the current amplifier 42. The amplifier 42 consists of a pair of direct-coupled transistors 52, 54 of the NPN variety. In the configuration shown, the transistors form what is commonly called an emitter follower type Darlington pair in that they have their collectors connected together at a point 55 and with the emitter of the first transistor directly attached to the base of the second transistor. The collector connection 55 is tied directly to a positive DC supply terminal 56 while the emitter terminal 58 constitutes the output terminal for the amplifier 42 and is connected to ground through a load resistor 59. A stabilizing resistor 60 having a value at least ten times larger than the load resistor 59 connects the output terminal 58 to the positive supply bus 56. The Darlington transistor arrangement used herein is particularly attractive for this application, since, when properly biased, the effective dynamic input impedance of the amplifier is equal to the product of the beta (current amplification factor) of the first transistor 52, the beta of the second transistor 54, and its load impedance. Typical silicone NPN transistors presently available may have current amplification factors of 100 or more when biased in their linear conduction range, Thus, in cascade, two such transistors will provide an amplification factor of 10,000. The input impedance of the amplifier 42 will be approximately 10,000 times the effective load resistance at the emitter terminal 58 which, for present purposes, will be at least 100 kilohms, making the input impedance to the amplifier 42 at least 1,000 megohms.

To obtain such a high input impedance from the amplifier 42 during static conditions, it is necessary to properly bias the input to render the transistors conductive in their linear range. To this end, the input circuit 41 includes a first voltage divider 61 connected between ground and the positive supply terminal 56. The voltage divider 61 in the present instance is variable through the movement of a wiper arm 62. The divided output voltage present on the wiper arm 62 is applied to the base of the transistor 52 via a diode 64 which is poled to allow bias current to flow into the transistor 52. It is desirable to establish a bias voltage on the wiper arm 62 of the voltage divider which will render the transistors 52 and 54 conductive near the lower current end of their linear region of conduction. Assuming the transistors 52, 54 and the diode 64 to be silicone devices, a voltage, such as about 1.8 volts, would have to be impressed across the three semi-conductor junctions before linear conduction is established. A second voltage divider 65, also in the form of a potentiometer has a wiper arm 66 for establishing a reference voltage substantially equal to the bias voltage at the base of the first transistor 52 of the amplifier 42. The transducer 12 in this case is part of a branch that includes the transducer 12 itself, a pair of bandpass control resistors 67, 68 in series with the transducer, and a conditioning capacitor 63 in parallel with the transducer. With the voltages at the opposite ends of the transducer branch being equal to the static condition of the circuit, zero current will flow through the transducer while it is in its inactive condition.

When an increase in stress occurs in the piezoelectric transducer 12, such as when a compressive force is exerted in the pitman 14 during the working stroke of the press 10, the piezoelectric crystal 20 produces a voltage across the transducer of a polarity indicated in FIG. 3. This voltage will be proportional to the stress applied, but it will be conditioned or limited by the loading effect of the condensor 63 so that its full load output is approximately 10 volts. Since the condensor 63 is in parallel with the transducer 12, it does not act as an external biasing element so as to reduce the effectiveness of the transducer. As a result, as the voltage across the transducer rises, the output voltage from the amplifier 42 also rises in a 1:1 ratio. However, the current available to drive the emitter load transistors of the amplifier 42 will be several orders of magnitude greater than the transducer current. The only load impressed upon the transducer, other than that of its conditioning capacitor 63, will be the dynamic input impedance of the transistor pair 52, 54 and the reverse impedances of the directional diode 64, both of which are in excess of 10 meghoms and provide a degree of isolation for the transducer.

In accordance with one aspect of the invention, the indicator circuit is responsive to the amplified transducer signal for indicating directly in tons the loads incurred by the pitman during operation of the press. The indicator circuit 44 is connected to the output of the circuit amplifier 42 at the emitter terminal 58. The indicator circuit 44 includes an amplifier 69 and a digital readout meter 70 having in this case three decimal digits on a display 71. The amplifier 69 again is a Darlington arrangement of direct coupled transistors 73, 74 having their collectors at a common point 72 with the emitter of the first transistor attached to the base of the second. The collector connection 72 is tied to the positive DC supply terminal 56 while the emitter terminal 77 constitutes the output terminal for the amplifier 69 and is connected to ground through a resistor 75. A resistor 76 located in a line between the input of transistor 73 and ground prevents shorting of the base of the transistor 73.

Figure 4:
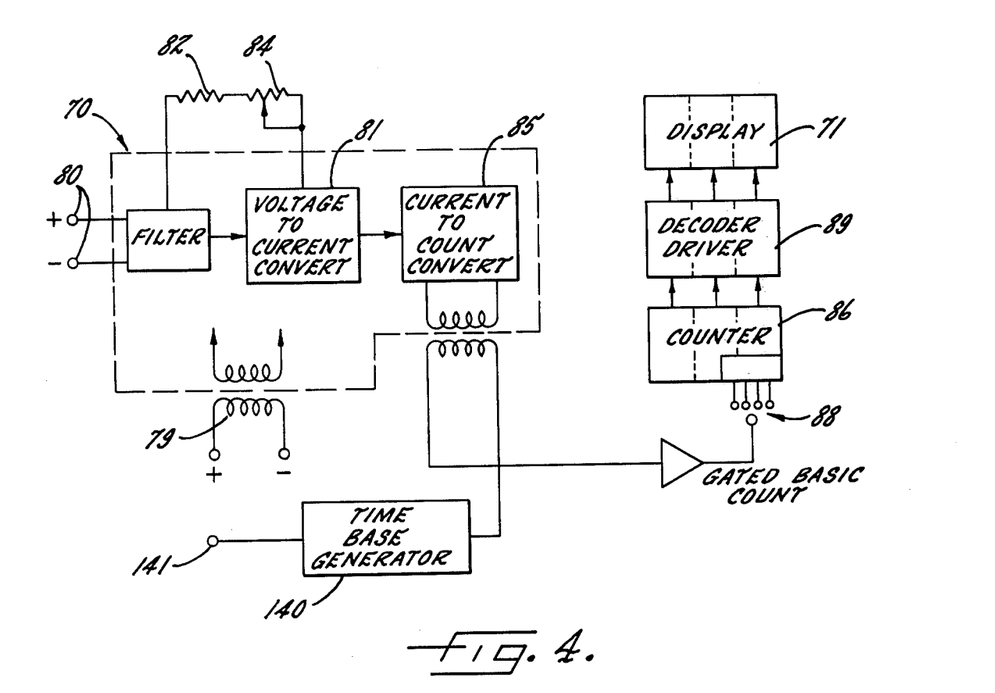
FIG. 4 is a diagram of a digital readout meter and its associated timing circuitry utilized in connection with the circuit shown in FIG. 3.

The digital meter 70, which may be of a known type, is connected to the output of the amplifier 69 in parallel with a voltage dropping resistor 78. As shown in FIG. 4, the illustrated digital meter 70 has an outside analog power supply 79 and the amplified transducer signal is applied to the meter leads 80. The input signal to the leads 80, which may have a full scale input range such as from 20 millivolts to 2.0 volts, drives a voltage to current converter 81, generating a proportional current that is determined by a feedback resistance comprising a resistor 82 and variable potentiometer 84. This current drives a current to a count converter 85, producing one basic count for each 1 microampere of current. The basic count during the gated output is transformer coupled to a counter 86 via the selected connections 88 which effects the desired display incrementing. For example, depending upon the connection at the counter 86, the basic count may be multiplied by 1, 2, 5, or 10 to increment the display accordingly. The counter outputs after being directed through a decoder drive 89 operate the display 71. The decimal point may be arbitrarily positioned in a known manner by grounding an appropriate panel meter terminal.

It will be seen that since the output signal from the amplifier 69 is proportional to the stress communicated to the transducer 12 from the press pitman 14 to the voltage across the meter 70 will likewise be proportional. To establish the voltage across the meter for a known load on the pitman and for no load or zero conditions, the output terminal of the meter is connected to a variable resistor 90 which in turn is coupled to the wiper of a potentiometer 91 connected between ground and the positive supply terminal 56. For example, the potentiometer 91 may be calibrated so that 80 millivolts, which is well within the 20 millivolt to 2.0 volt full scale input range of the meter, may be imparted across the meter 70 upon a transducer signal generated from a 100 percent loading, for example 75 tons, on the pitman.

For the meter 70 to indicate the proper number of tons of loading sustained by the pitman, the feedback resistance for the meter must then be adjusted. In the illustrated meter, if each digitation of the meter requires 1 microampere, the rated capacity of the press pitman were 75 tons, and the digital meter connection were set to digitize in increments of 2, a total of 375 digitations would be required for the 3 digit meter to digitize in two's from 0 to 750. The total of 375 digitations in the illustrated meter would require 375 microamperes. With both the current (375 microamperes) and the voltage across the meter (80 millivolts) known for a 75 ton loading, the feedback resistance for the meter may then be calculated. Such a feedback resistance may then be established through adjustment of the variable potentiometer 84. With the feedback resistances 82 and 84 of the meter so established and the decimal appropriately placed, when a 75 ton load is exhibited on the pitman 14 the resulting 375 microamperes through the meter will register a reading of 75.0. Since the output signals for the transducer are proportional to the load applied, the meter display 71 will similarly register in numbers of tons other loads the pitman sustains during operation of the press.

It will become apparent that when calibrating the meter and placing of the decimal point for the display, allowance should be made for significantly higher tonnages than the rated capacity, such as at least 30 percent higher loads, so as to permit the meter to indicate significant overloads if they should occur. For example, if the capacity of the press pitman were 95 tons, it would be desirable to change the decimal point such that full load reading would be "095". This would permit the meter to indicate substantial overloads, rather than only overloads up to 5 tons as is the case when the decimal point is placed in the manner previously illustrated.

For the purpose of holding the signal generated by the transducer 12 for a sufficient time to permit the meter 70 to fully digitize and enable that indication to remain long enough to permit the operator to observe the tonnage reading, the illustrated indicator circuit 44 includes a peak holding circuit 94. The peak holding circuit 94 comprises a capacitor 95 connected between the input of the transistor 73 and ground. The capacitor 95 is charged by current flowing from the amplifier 42 and such charge enables a prolonged current flow to be maintained through the amplifier 65 and digital meter 70. A directional diode 96 in this case is connected in parallel with the capacitor 95 and acts as a loading impedance for the amplifier 69. A diode 98 also is included in the input line to the indicator circuit amplifier 69 to prevent reverse current flow from the capacitor 95. It will be appreciated that by reason of the peak holding circuit 94 relatively inexpensive and slower operating digital meters may be utilized so as to enhance the economy of the system. Following a working stroke of the press and the resulting tonnage reading in the meter 70, the meter if desired may be quickly returned to zero by depressing a reset button 99 connected in series with the resistor 76 and diode 100, which has the effect of unloading the capacitor 95 to ground.

In keeping with the invention, the limiting circuit is controllable by a dial means having a numerical readout which when set to a selected number is adapted to activate an overload detection means when a corresponding number of tons on the pitman has been exceeded. The limiting circuit 45 in this case includes a relay CR1 that is adapted to be energized when the transducer signal from the amplifier 42 exceeds a predetermined threshold value. The relay CR1 is selectively controllable by a relay control circuit 104 that includes a control rectifier 105 having anode, cathode and gate terminals 106, 107, and 108, respectively, with the cathode terminal 107 referenced to a variable voltage point 109 tied to the emitter of a current amplifier which in this case is in the form of a transistor 110. The gate terminal 108 of the controlled rectifier 105 is connected to the output terminal 58 of the amplifier 42 through an input resistance 111 and a voltage divider consisting of resistors 112 and 114.

The controlled rectifier 105, typically a silicone device designated as an SCR, is rendered conductive when the voltage at the gate terminal 108 exceeds a reference voltage at the cathode terminal 107 by a fixed amount. Once the rectifier begins conducting, it will remain conducting so long as the current flowing through the anode-cathode junction remains sufficiently high. In the present instance, the forward current of the rectifier 105 is limited by a fixed resistance 115, and the realy CR1 preferably is selected to be energized with forward current through the rectifier 105 limited to substantially the minimum holding current necessary to maintain the rectifier 105 in conduction, thereby minimizing power consumption.

The threshold voltage which will trigger the rectifier 105 is established by the gate voltage divider consisting of resistors 112 and 114 and the voltage at the emitter of the transistor 110. To selectively establish the voltage at the transistor emitter, the base of the transistor 110 is referenced to a variable voltage at the wiper of a potentiometer 118. The potentiometer forms one part of a voltage divider 119 connected between ground and the positive supply terminal 56, which divider also includes a resistor 120, a "coarse" control reostat 121 and a "fine" control reostat 122.

In carrying out the invention, the potentiometer 118 is manually adjustable by a digital readout dial 130. The digital dial 130 may be of a known type having a rotatable head and shaft and a numerical counter which counts rotational movement of the dial head and shaft. For example, in the 3 digit dial shown, it may require five turns to go to a "500" reading and a total of 10 turns to return to the original "000" reading. The potentiometer is a rotary potentiometer, also of a conventional type, having its rotatably actuated wiper blade coupled to the dial shaft. The potentiometer preferably is of a type which will make a similar number of turns as the dial when transgressing between opposite limits.

The voltage divider 119 may be calibrated such that when the dial 130 is set to a given number, the wiper of the potentiometer 118 is positioned such as will effect a biasing voltage for the rectifir 105 that permits firing of the rectifier only when a transducer signal is generated by a force in the press pitman in excess of the number of tons set on the dial. For example, if the press pitman has a 75 ton rating, the voltage divider 119 first will be set so that the rectifier fires or conducts at a zero or no load rating on the pitman. The potentiometer 118 may then be turned 7½ turns and the voltage divider 119 calibrated so that the rectifier will fire at such setting when a loading of 75 tons is sustained by the pitman. the dial 130 may then be set to read 75.0 at the latter setting of the potentiometer. If the dial and potentiometer both are 10 turn devices, 7½ turns in the reverse direction would return both the dial and the potentiometer to the zero load setting. Likewise, any setting above or below 75.0 would cause the rectifier to conduct only when the loading on the pitman exceeds the identical number of tons as set on the dial 130. It will be understood that the relay 82 is energized each time the SCR rectifier becomes conductive, and the relay may be utilized to activate suitable press control or overload detection means such as a control switch which would automatically shut down the press when the set load is exceeded.

To deenergize the relay CR1 after it has been activated, a reset switch 131 is connected in series with the relay CR1. A diode 132 is connected in parallel with the energization coil of the relay CR1 and poled to dissipate the stored charge on the coil of the relay CR1 at turn-off and to limit the reverse voltage build-up across the coil. The speed at which the relay deenergizes is further increased by a condensor 134 connected between the anode and the cathode terminals of the rectifier 105.

It will be appreciated that since the potentiometer 118 merely controls the voltage to the transistor 110 it may be of a sufficiently large resistance to permit a wide range of adjustment without impeding the flow of current from the rectifier 105. For example, in the case of a press having a rated capacity of 100 tons, the setting of the potentiometer would be limited largely to its lower 10 percent range, and in such case, a relatively large resistance might be desirable to provide a sufficiently sensitive control of the biasing voltage of the rectifier. It will also be understood that while a transistor 110 has been shown in the illustrated embodiment for amplifying the current from the voltage divider 119, alternative means such as an operational amplifier or FET amplifier could be used.

In accordance with another feature of the invention, means are provided for holding an indicator tonnage reading that occurs during an overload stroke so that the operator will be able to know the maximum load the press pitman sustained during the overload even if not in the vicinity of the press at the time. The meter 70 in this case includes a time base generator 140 which is adapted to provide in a known manner a synchronizing pulse at the start of each conversion cycle and a precision gate of a relatively short time period, such as 10 microseconds, to control the time base of the current to count convertor 85. The start of a conversion may be controlled by an external hold signal applied at a meter terminal 141 to effectively hold the results of the measurement and display it as long as desired. For this purpose, means are provided for shorting the hold terminal 141 substantially to ground when an overload actuates the overload relay CR1, and a timing circuit 142 delays such signal by a predetermined short time so as to permit the maximum load incurred during the overload stroke of the press to be fully digitized on the meter.

In the illustrated embodiment, the meter terminal 141 is coupled to the anode of an SCR control rectifier 144 which has its cathode connected to ground and its gate terminal connected to the timing circuit 142. When the load on the press pitman 14 exceeds the number of tons set by the dial 130 of the overload circuit 45 so that the relay CR1 is energized, the contact CR11 is closed, which in turn causes a second relay CR2 to be energized by the power supply 56. Energization of the relay CR2 closes a contact CR21 in the timing circuit 142 which then connects the timing circuit to separate relatively lower power supply 145. The power supply 145 feeds a resistor 146 for a period of time until a voltage is built up across a capacitor 148. At that time, current will flow to a Darlington amplifier 149 consisting of direct coupled transducers 150, 151 with the base of the first transistor 150 connected to the junction point for the capacitor 148 and resistor 146. The collectors of the transistors 150, 151 are connected to a point tied directly to the power supply terminal 145 while the emitter terminal of the transistor 151 constitutes the output terminal of the amplifier and is connected to ground through a load resistor 152. The output terminal of the amplifier 149 also is connected to the gate terminal of the control rectifier 144 through the voltage divider consisting of resistors 154 and 155.

It will be seen that when contact CR21 is closed following actuation of the overload circuit 45 a short time delay results before voltage builds up across the capacitor 148. This time delay permits the digital meter 70 to fully digitize the load sustained by the press during the overload stroke. The eventual current flow to the ampliifer 149 and voltage buildup at the gate terminal of the rectifier 144, however, will then render the rectifier 144 conductive, which will have the effect of shorting the hold terminal 141 of the meter 70 to ground and thereby lock the meter reading indefinitely. The digital meter 70 is thus permitted to record the maximum load exerted on the pitman during the overload stroke and is caused to hold that reading even after the press is shut down by the limit circuit 45. A reset switch 158 may be manually operated to disconnect the rectifier 144 from ground and permit resetting of the digital meter 70.

As shown in FIG. 1, the display 71 of the digital meter 70 and digital dial 130 for the limiting circuit 44 both may be mounted in a face plate of the monitor 11 for easy access and observation. It can be seen that the digital meter 70 will provide a readout directly in tons of the maximum loads exerted on the press pitman during its successive operating strokes. At the same time, the digital dial 130 may be set for a given number of tons, and when that loading on the pitman is exceeded the limiting circuit 45 will activate an overload detection or control means. Even when an overload does occur and the overload control means, for example, shuts down the press, the maximum load incurred by the pitman during the overload stroke nevertheless is registered on the digitl meter 70 and that reading is locked in place. A reset button 160 may be provided on the face of the plate to operate one or more of the reset switches in the system. Moreover, the monitor 11 may include a second meter 161 and dial 162 that are adapted to monitor and indicate the loads at a second point on the pitman by circuitry similar to that described above.

I claim as my invention:

1. A system for monitoring tonnage loads that are intermittently applied to a deformable member comprising a transducer fixed to said member and adapted to produce an electrical output signal having a voltage substantially proportional to the applied load, an indicator circuit coupled to said transducer, said indicator circuit including a digital readout meter having a display of a plurality of numerical digits, said indicator circuit being responsive to said transducer signals to cause said meter to digitize the number of tons of loading applied to said member, a load limiting circuit coupled to said transducer including an overload detecting means, a digital dial operatively coupled to said limiting circuit, said dial having a display of numerical digits which may be selectively set to a number identical to the maximum desired number of tons of loading for application on said member, said limiting circuit being responsive to said signal generated by said transducer to activate said overload detection means when the number of tons of loading applied to said member exceeds the number set on said dial display, and means responsive to activation of said overload detection means for holding indefinitely the numerical reading of said meter display.

2. The load monitoring system of claim 1 in which an amplifying means couples said meter to said transducer, and peak holding circuit means coupled to the input of said amplifying means for maintaining a signal to said meter for a sufficient time to permit said meter to fully digitize the numerical value of the load applied to said member.

3. The load monitoring system of claim 2 in which said peak holding circuit includes a capacitor coupled between the input of said amplifying means and ground, and unidirectional means for preventing current flow away from the input of said amplifying means.

4. The load monitoring system of claim 1 in which said transducer includes a pair of mounting brackets fixed to said member substantially in line with the stress to be detected and including a piezoelectric element interposed between said mounting means for generating said electrical output signals, said meter being connected between an amplifying means and a voltage divider means that is selectively adjustable to establish a predetermined voltage across said meter, said overload detection means including an output relay, and relay control means coupled to said amplifying means and adapted to energize said relay when said transducer signal exceeds a predetermined threshold voltage.

5. The load monitoring system of claim 4 in which said relay control means includes a controlled rectifier having anode, cathode and gate terminals with said gate being coupled to said amplifying means, and a second amplifying means coupled between said rectifier cathode terminal and a point of reference potential which controls said threshold voltage.

6. The load monitoring system of claim 5 in which said second amplifying means is a transistor having base, collector, and emitter terminals, said transistor emitter terminal being coupled to said rectifier gate, and a voltage divider coupled to said transistor base for establishing a determined reference voltage at said second amplifying means.

7. The load monitoring system of claim 6 wherein said dial is rotatable through a determined number of turns when transgressing from a zero setting to its maximum numerical setting, and said voltage divider includes a potentiometer with a rotatable wiper coupled to said dial for rotation therewith.

8. The load monitoring system of claim 7 in which said potentiometer wiper is rotatable through a similar number of turns as said dial when transgressing between its opposite resistive limits.

9. the load monitoring system of claim 4 including means responsive to energization of said relay for imparting an input signal to said meter display holding means, and means for delaying for a relatively short predetermined period the signal to said holding means following energization of said relay.

10. The load monitoring system of claim 9 in which said means for imparting said input signal to said meter display holding means includes a rectifier coupled to said meter, means activated by energization of said relay for creating a voltage at the gate terminal of said rectifier sufficient to cause cnduction of said rectifier and a resulting signal to said display holding means, said delay means includes a delay circuit including a resistor and capacitor coupled in series, means coupling the junction of said resistor and capacitor to said rectifier, a power supply means for said delay circuit, and means connecting said resistor and capacitor to said delay circuit power supply means in response to energization of said relay.

11. A system for sensing stresses and monitoring tonnage loads that are intermittently applied to a deformable member comprising a transducer having a pair of mounting means fixed to said member substantially in line with the stress to be detected, said transducer including a piezoelectric element interposed between said mounting means for generating output electrical signals having voltages substantially proportional to the loads applied to said member, amplifying means coupled to said transducer for amplifying a signal produced by said transducer, a load indicating circuit coupled to said amplifying means, said load indicating circuit including a digital readout meter which has a display of a plurality of numerical digits and is actuated in response to said transducer signals, a peak holding circuit means for maintaining a transducer signal to said amplifying means for a sufficient time to enable said meter to fully digitize the numerical value of successive loads applied to said member in response to said transducer signals, said peak holding circuit means including a capacitor coupled between an input side of said amplifying means and ground, and a diode connected between said transducer and amplifying means and poled to allow conduction of current from said capacitor only in the direction of said amplifying means.

12. The load monitoring system of claim 11 including a load limiting circuit coupled to said transducer, said load limiting circuit including an overload detection means, said limiting circuit having control means for selectively setting a maximum desired loading on said member, and said limiting circuit being responsive to signals generated by said transducer to activate said overload detection means when the loading on said member exceeds the loading set by said control means.

13. The load monitoring system of claim 12 in which said meter includes means responsive to an input signal for locking in place the load indication of said meter, means responsive to actuation of said overload detection means for imparting said input signal to said meter locking means, and means for delaying for a relatively short predetermined period the signal to said meter locking means following activation of said overload detection means.

14. The load monitoring system of claim 12 including means responsive to activation of said overload detection means for holding indefinitely the load indication of said meter.

15. A system for sensing stresses and monitoring tonnage loads that are intermittely applied to a deformable member comprising a transducer having a pair of mounting means fixed to said member substantially in line with the stress to be detected, said transducer including a piezoelectric element interposed between said mounting means for generating output electrical signals having voltages substantially proportional to the loads applied to said member, amplifying means coupled to said transducer for amplifying a signal produced by said transducer, load indicating means coupled to said amplifying means, said load indicating means including a digital readout meter having a display of a plurality of numerical digits, a peak holding circuit means for maintaining a transducer signal to said amplifying means for a sufficient time to enable said meter to successively and fully digitize the number of tons of loading successively applied to said member, said peak holding circuit means including a capacitor coupled between an input side of said amplifying means and ground, a diode connected between said transducer and amplifying means and poled to allow conduction of current from said capacitor only in the direction of said amplifying means, a load limiting circuit coupled to said transducer including an overload detecting means, a digital dial operatively coupled to said limiting circuit, said dial having a display of numerical digits which may be selectively set to a number identical to the maximum desired number of tons of loading for application on said member, said limiting circuit being responsive to said signal generated by said transducer to activate said overload detection means when a number of tons of loading applied to said member exceeds the number set on said dial display, and means responsive to activation of said overload detection means for holding indefinitely the numerical reading of said meter display.

16. The load monitoring system of claim 15 in which said overload detection means includes an output relay, relay control means for energizing said relay when said transducer signal exceeds a predetermined threshold value, said relay control means being coupled to a variable potentiometer, and said digital dial means being operatively connected to said variable potentiometer to selectively vary the resistance of said potentiometer and the threshold voltage at said relay control means.

17. A system for monitoring tonnage loads that are intermittently and successively applied to a deformable member comprising a transducer fixed to said member and adapted to produce an electrical output signal having a voltage substantially proportional to the applied load, an indicator circuit coupled to said transducer and including a meter, said indicator circuit being responsive to signals generated by said transducer to cause said meter to successively indicate the loading applied to said body, a load limiting circuit coupled to said transducer including an overload detection means, dial means operatively coupled to said limiting circuit for setting a maximum desired loading on said member, said limiting circuit being responsive to signals generated by said transducer to activate said overload detection means when the loading on said member exceeds the setting of said dial means, and means responsive to activation of said overload detection means for holding indefinitely the load indication of said meter.

18. The load monitoring system of claim 17 in which said meter includes means responsive to an input signal for locking in place the load indication of said meter, means responsive to actuation of said overload detection means for imparting said input signal to said meter locking means, and means for delaying for a relatively short predetermined period the signal to said meter locking means following activation of said overload detection means.

19. The load monitoring system of claim 18 including amplifying means coupled to said transducer for providing an output voltage which is linearly proportional to the voltage of the transducer signal, said overload detection means including an output relay, relay control means coupled to said amplifying means and adapted to energize said relay when said transducer signal exceeds a predetermined threshold voltage, said means for imparting said input signal to said meter locking means including a rectifier coupled to said meter, means activated by energization of said relay for creating a voltage at the gate terminal of said rectifier sufficient to cause conduction of said rectifier and a resulting signal to said locking means.

20. The load monitoring system of claim 19 in which said delaying means includes a resistor and a capacitor coupled in series, means connecting said resistor and capacitor to a delaying circuit power supply means in response to energization of said realy, and means coupling the junction of said resistor and capacitor to said rectifier gate terminal.

21. The load monitoring system of claim 20 in which said means for connecting said junction of said resistor and capacitor to said rectifier includes a second amplifying means coupled to said junction and a voltage divider means coupled between said second amplifier means and said rectifier gate terminal.

22. The load monitoring system of claim 21 including power supply means for said indicator circuit, said means for connecting said resistor and capacitor to said delaying circuit power supply including a first contact and a second relay in a line connected to said indicator circuit power supply means, said first contact being closed upon energization of said first relay, said second relay being energized by said indicator circuit power supply upon closing of said first contact, and a second contact that is closed upon energization of said second relay to couple said resistor and capacitor to said delaying circuit power supply.

23. A system for monitoring tonnage loads that are intermittently and successively applied to a deformable member comprising a transducer fixed to said member and adapted to produce an electrical output signal having a voltage substantially proportional to the applied load, an indicator circuit coupled to said transducer and including a meter, said indicator circuit being responsive to signals generated by said transducer to cause said meter to successively indicate the loading applied to said body, a load limiting circuit coupled to said transducer including an overload detection means, said limiting circuit including control means for selectively setting a maximum desired loading on said member, said limiting circuit being responsive to signals generated by said transducer to activate said overload detection means when the loading on said member exceeds the loading set by said control means, and means responsive to activation of said overload detection means for holding indefinitely the load indication of said meter.

24. The load monitoring system of claim 23 in which said transducer includes a pair of mounting brackets fixed to said member substantially in line with the stress to be detected, and a piezoelectric element is interposed between said mounting brackets for generating said electrical output signals.

25. The load monitoring system of claim 23 in which said meter is digital readout device having a display of a plurality of numerical digits, and said indicator circuit is responsive to said transducer signals to cause said meter to digitize the number of tons of loading applied to said member.

26. The load monitoring system of claim 23 in which an amplifying means couples said meter to said transducer, and peak holding circuit means coupled to the input of said amplifying means for maintaining a signal to said meter for a sufficient time to permit said meter to fully digitize the numerical value of the load applied to said member.

27. The load monitoring system of claim 26 in which said peak holding circuit includes a capacitor coupled between the input of said amplifying means and ground, and unidirectional means for preventing current flow away from the input of said amplifying means.

28. The load monitoring system of claim 23 in which said control means is a dial operatively coupled to said limiting circuit, said dial being selectively adjustable to a number corresponding to the maximum desired number to tons of loading on said member, and said limiting circuit being responsive to said signals generated by said transducer to activate said overload detection means when the number of tons of loading applied to said member exceeds the number set by said dial.

* * * * *